United States Patent

Beardmore et al.

[15] 3,647,010

[45] Mar. 7, 1972

[54] MECHANICAL LOAD MEASURING SYSTEMS

[72] Inventors: Alfred Cyril Beardmore, Wednesbury; Geoffrey Cyril Cooke, Pedmore; Donald Charles Stringer, Walsall, all of England

[73] Assignee: W. & T. Avery Limited, Birmingham, England

[22] Filed: June 30, 1969

[21] Appl. No.: 837,644

[52] U.S. Cl. .............................................. 177/230, 177/170
[51] Int. Cl. ......................................................... G01g 23/26
[58] Field of Search................... 177/170, 195, 225, 230, 231

[56] References Cited

UNITED STATES PATENTS

| | | | |
|---|---|---|---|
| 1,806,741 | 5/1931 | Cameron.......................... | 177/225 UX |
| 2,681,566 | 6/1954 | Ruge.............................. | 177/225 UX |
| 2,698,747 | 1/1955 | Stalzer........................... | 177/225 UX |
| 3,382,942 | 5/1968 | Schmitter........................ | 177/170 |

FOREIGN PATENTS OR APPLICATIONS 380,401 9/1964 Switzerland ............................ 177/170

Primary Examiner—Stephen J. Tomsky
Assistant Examiner—George H. Miller, Jr.
Attorney—Norris & Bateman

[57] ABSTRACT

In a load measuring system such as self-indicating weighing machine a compensating spring is applied between a fixed point and a part of a lever of the system which is deflected when a load to be measured is applied thereto. The magnitude of the deflection provides the measure of the load and the spring serves to apply a compensating moment to the lever which varies with the amount of angular displacement thereof to oppose a nonlinear error otherwise inherent in the system as between the load actually applied and the quantity indicated by the magnitude of the deflection.

15 Claims, 6 Drawing Figures

PATENTED MAR 7 1972 3,647,010

INVENTORS
ALFRED CYRIL BEARDMORE, GEOFFREY CYRIL COOKE,
DONALD CHARLES STRINGER

By

MECHANICAL LOAD MEASURING SYSTEMS

This invention relates to mechanical load measuring systems, and particularly but not exclusively to the load measuring system of a weighing or testing machine of the self-indicating type.

It is very well known to provide a load measuring system including at least one lever fulcrumed on a fixed frame with means for applying a load to be measured to the lever against an opposing resistant also applied to the lever, the angular displacement of the lever being measured to provide a measure of the magnitude of the load.

Where the resistant used is a spring it is found in practice that the relationship between the load applied to the lever and the measured displacement thereof is nonlinear.

Correction can be made to provide a linear relationship under zero load, full capacity load, and half capacity load, but a nonlinear error remains in the ranges between zero and half capacity load, and between the latter and full capacity load. These residual errors are usually of equal magnitude and opposite sense in the case of a simple spring resistant.

The object of the invention is to provide compensating means which is effective to provide a substantially linear load/displacement relationship throughout the zero to full capacity range of a load measuring system.

According to the invention a mechanical load measuring system including at least one lever fulcrumed on a fixed frame, means for applying a load to be measured to the lever so that it exerts a turning moment about its fulcrum, a resistant exerting an opposite turning moment on the lever, and measuring means responsive to the magnitude of angular displacement of the lever by the load to provide a measure of the magnitude of the load, is characterized in that compensating spring means 24 is connected between the frame and a relatively movable part of the lever or measuring means so as to apply a compensating moment to the lever which varies with the amount of angular displacement of the lever throughout at least a part of the operating range of the system, and which is in opposition to a nonlinear error otherwise inherent as between the magnitude of the applied load and the magnitude of said angular displacement.

A preferred embodiment of the invention is now described with reference to the accompanying drawings wherein.

Figure 1:
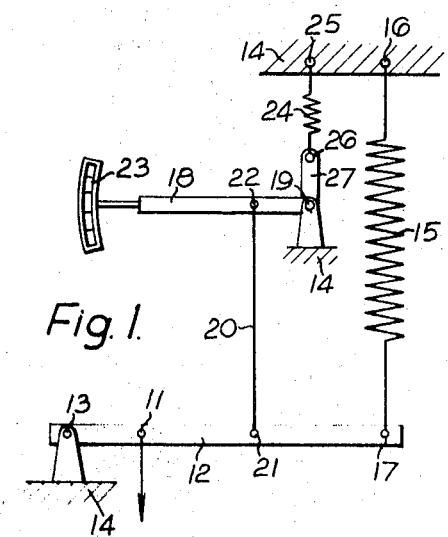
FIG. 1 is a schematic side view of a weighing mechanism incorporating a load measuring system according to the invention.

Referring now to FIG. 1, the load measuring system of a weighing machine comprises a weigh lever 12 fulcrumed at 13 on a fixed frame 14. A load to be measured is applied to the lever through conventional weighing machine interlever mechanism (not shown) and a link connecting with a pivot 11 spaced from the fulcrum 13. A resistant 15 in the form of a tension spring interconnects the end 17 of the weigh lever remote from its fulcrum 13, and a fixed point 16 on frame 14 so that end 17 of the lever 12 is urged upwards when no load is applied, and the lever is angularly deflected by the turning moment of a load applied to pivot 11 in opposition to the resistant spring 15, the magnitude of said angular displacement varying according to the magnitude of the applied load.

An indicating lever 18 is mounted on a shaft 19 pivoted on frame 14 and is pivotally connected to lever 12 by a transfer rod 20 extending between pivot point 22 on lever 18 and pivot point 21 on lever 12 so that angular deflection of the latter produces a proportionate angular deflection of indicating lever 18 as visually measured against a calibrated chart 23 by means of an optical projection system (not shown). The load measuring system is adjusted by conventional means (for example by adjusting the position of pivot point 16 to vary the angle at which resistant spring 15 acts on the lever 12), so that with a one-half of full capacity load applied to the machine, both the weigh lever 12 and the indicating lever 18 are horizontal, and transfer rod 20 is vertical, and chart 23 reads the correct weight.

A compensating spring in the form of a helical tension spring 24 extends between a pivotal anchorage point 25 attached to the fixed frame 14 and a pivotal attachment 26 at the upper end of arm 27, said arm being mounted on shaft 19 rigidly in relation to lever 18 so as to constitute a bellcrank lever.

Figure 2:
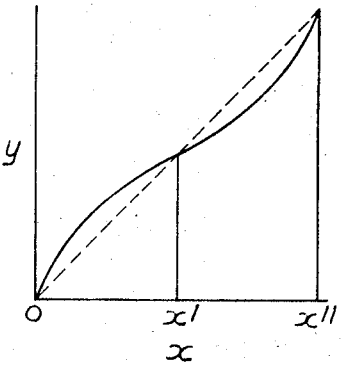
FIG. 2 is a graph of the relationship between applied load and lever displacement in a mechanism not incorporating the invention.

The mounting of spring 24 is described in greater detail below. When the load measuring system is at half capacity loading (as shown in FIG. 1) pivot 19 of indicating lever 18 and the two attachment points 26 and 25 of compensating spring 24 all lie in a straight line so that the spring 24 exerts no turning moment on the lever system. Assuming that compensating spring 24 were not included, the graph of FIG. 2 shows how deflection of the indicating lever 18 ($y$-axis on graph) would be related to the applied load being measured ($x$-axis on graph). The deviations of angular deflection of lever 18 from a linear function are symmetrical about the half capacity load position ($x'$ on graph) but of opposite signs. The full load position is indicated at $x''$. Thus if chart 23 is graduated in equal increments of load for equal increments of angular deflection of lever 18 a positive error in indication obtains (i.e., the chart indicates a greater load than that actually applied) when the load is in the range between zero and half of full load; and a negative error obtains in the remainder of the range.

Figure 3:
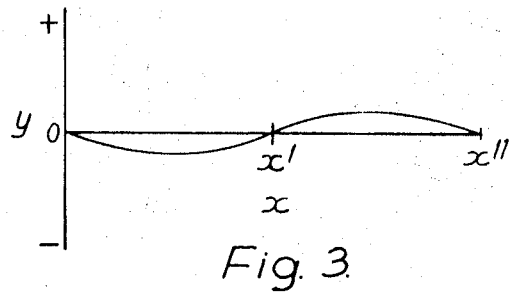
FIG. 3 is a graph of an example of the compensating effect provided by the invention.

The effect of a spring mounted in the manner of spring 24 of the embodiment now described is shown in graph form in FIG. 3 wherein the $x$-axis represents a load applied to point 22 of the lever 18 and the $y$-axis represents deviation from linearity of the turning movement exerted by spring 24 on the lever. This deviation is complementary to the deviation from linearity illustrated in FIG. 2. Hence the application of the compensating spring 24 will substantially cancel out the nonlinear errors inherent in the load measuring system when the spring is suitably adjusted.

Figure 4:
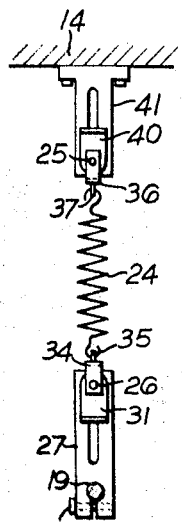
FIG. 4 is a side elevation of the compensating spring mechanism utilized in the system shown in FIG. 1.
Figure 5:
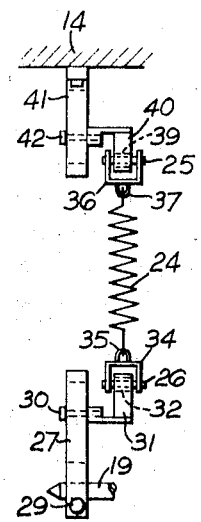
FIG. 5 is a front elevation of the mechanism shown in FIG. 4.

Spring 24 and its mountings are shown in greater detail in FIGS. 4 and 5. Arm 27 is mounted on the pivot shaft 19 of indicating lever 18 and is held against angular movement relative to said shaft by clamp screw 29. Arm 27 includes a longitudinal slot to receive a bolt 30 for mounting a first anchorage block 31. Block 31 includes a bearing 32 through which passes a pivot pin 26 to mount a shackle 34 pivotally so that it is angularly movable about an axis parallel to the axis of pivot shaft 19. Shackle 34 includes a loop 35 through which the lower end of spring 24 is hooked. The other end of the spring is mounted by means of a similar shackle 36 having a loop 37, and pivot pin 25 carried in a bearing 39 of a second anchorage block 40. Second block 40 is mounted on a bracket 41 affixed to the frame 14. Bracket 41 includes a longitudinal slot through which a bolt 42 is passed to secure the second block 40, and the axis of pivoting of the shackle 36 in that block is parallel to the axis of pivoting of the other shackle 34. Bolts 30, 42 may be positioned in their respective slots to vary the tension of spring 24, the spacing of pivots 25 and 26, and also to vary the effective length of arm 27. Screw 29 enables the angular position of arm 27 to be varied relative to indicating lever 18. Further adjustment may be provided by varying the stiffness of the spring by known means.

Figure 6:
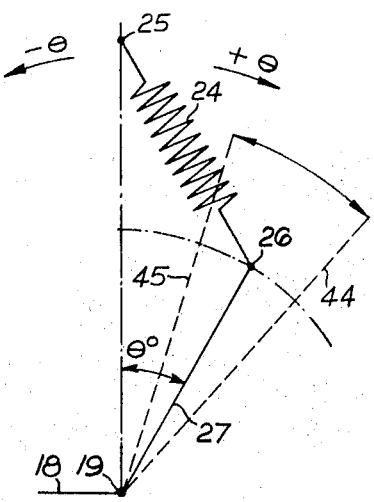
FIG. 6 is a diagram of the correction function of a compensating spring in another arrangement of the mechanism shown in FIG. 1.

FIG. 6 is a diagram of the operation of spring 24 where arm 27 is angularly positioned so that attachment pivot 26 is out of line with pivot 19 and fixed attachment pivot 25 at the half load position.

FIG. 6 shows the load measuring system at this position, i.e., with lever 18 horizontal, and in this position arm 27 forms an angle $\theta$ to the vertical, the range of movement of arm 27 throughout the full weighing range being indicated by dotted lines 44,45. The effect of increasing angle $\theta$ from zero is to shift the point at which the curve shown in the graph of FIG. 3 ($x'$) cuts the axis, away from the half capacity load position and in a direction towards either the zero or the full load ($x''$) position depending on whether angle $\theta$ is positive or negative. If $\theta$ is increased beyond a certain angle the point at which the curve cuts the x-axis can be arranged to fall outside the range of the machine so that the curve of the graph of FIG. 3 will show the same sign throughout.

In all the above-described embodiments the mounting of the compensating spring may be varied provided that the effect of the force exerted by the spring during movement of the indicating lever is the same. Thus it is not essential that the spring pivot points both lie within the plane of angular movement of the lever. The pivotal mountings of the compensating spring may be given freedom of angular movement in one, two or three directions, as by the use of a universal swivel joint.

I claim:

1. A load measuring system comprising a weigh lever fulcrumed for angular displacement about an axis, means for applying a load to said weigh lever for exerting a turning moment about said fulcrum, spring resistant means exerting an opposite turning moment on said weigh lever, an indicating lever pivoted about a fixed axis, a scale operatively associated with said indicating lever, motion transmitting means connecting said weigh lever to said indicating lever so that said indicating lever is pivotally displaced by angular displacement of said weigh lever, and a compensating spring directly connected to said indicating lever for exerting a compensating moment that varies continually during angular displacement of said weigh lever to provide for equal incremental displacements of said indicating lever for equal increments of load applied to said weigh lever, said indicating lever being a bellcrank having one arm adapted to cooperate with said scale and the compensating spring being connected to the other arm of said bellcrank.

2. A mechanical load measuring system including a load bearing lever fulcrumed on a fixed frame, means for applying a load to be measured to said lever so as to exert a turning moment about the fulcrum, a spring resistant exerting an opposite turning moment on the lever, and measuring means responsive to the magnitude of angular displacement of the lever under load to provide a measure of magnitude of the load, characterized by an arm mounted for angular displacement about a fixed axis, means connected to said arm for effecting angular displacement of said arm by angular movement of said lever, and a compensating tension spring connected between a first anchorage on the frame and a second anchorage on said arm, whereby the tension of said compensating spring and the angular direction at which the force of said compensating spring is applied to the arm are both substantially varied during said angular displacement to apply a compensating moment which varies nonlinearly throughout at least a part of the operating range of the system and which is in opposition to a nonlinear error otherwise inherent in at least part of the range between the magnitude of the applied load and the measure of said load provided by said measuring means, and further characterized in that at one predetermined angular position of the lever the second anchorage may be brought into line with the first anchorage and said fixed axis whereby a zero compensating moment is applied at said position.

3. A load measuring system according to claim 2 characterized in that the resistant includes a tension spring adjustable so that the relationship between the magnitude of the applied load and the magnitude of the angular displacement of the lever is linear when said load is zero, half of full capacity, and full capacity, and the nonlinear error opposed by the compensating moment occurs in the ranges between said load values.

4. A load measuring system according to claim 2 characterized by means for adjustment of the angular displacement at which the compensating moment is applied to the lever.

5. A load measuring system according to claim 2 characterized in that the measuring means includes an optical projection system.

6. A load measuring system according to claim 2, wherein said zero compensating moment is applied when said lever is at a position determined by a load which is one-half of the full capacity of the system.

7. A load measuring system according to claim 2, wherein the measuring means includes an indicating lever linked to the load bearing lever, and the second anchorage of the compensating spring is on an arm of said indicating lever.

8. A load measuring system according to claim 2, wherein said zero compensating moment is applied at an angular position of the lever which is outside the normal and predetermined weighing range of the machine whereby the nonlinear compensation applied throughout said range is always of the same sign.

9. A load measuring system according to claim 2, wherein means is provided for adjustment of said arm about said fixed axis for varying the angular location of said arm relative to a part of the lever to which the load and resistant are applied.

10. A load measuring system according to claim 9, wherein said arm is carried by a rockable pivot member, and said adjustment comprises releasable clamp means connecting the arm to said pivot member.

11. A load measuring system according to claim 2 characterized in that the quantity of the compensating moment applied to the lever can be adjusted.

12. A load measuring system according to claim 10, characterized in that means for adjusting said quantity includes means for varying the distance between the second anchorage and the fixed axis of said arm.

13. A load measuring system according to claim 10 characterized in that means for adjusting said quantity includes means for varying the distance between the first anchorage on the frame and the fixed axis of said arm.

14. A load measuring system according to claim 11 characterized in that means for adjusting said quantity includes means for varying the tension of the compensating spring means.

15. A load measuring system according to claim 11 characterized in that means for adjusting said quantity includes means for varying the stiffness of the compensating spring means.

* * * * *